S. P. TAYLOR.
CULTIVATOR.
APPLICATION FILED MAR. 24, 1919.
1,363,375.
Patented Dec. 28, 1920.
2 SHEETS—SHEET 1.
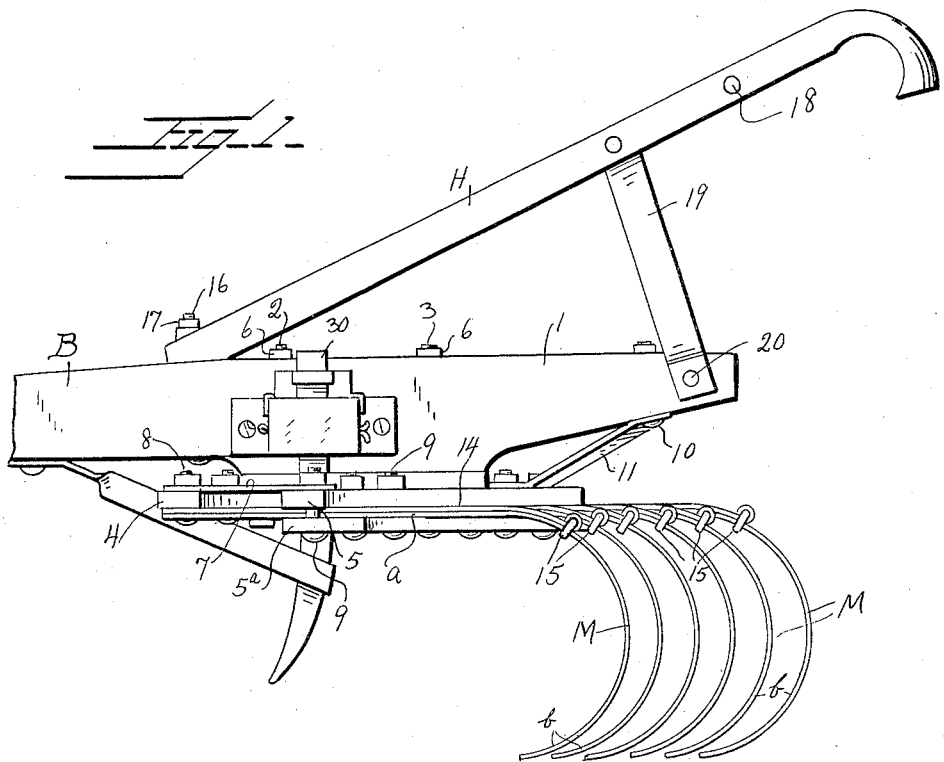
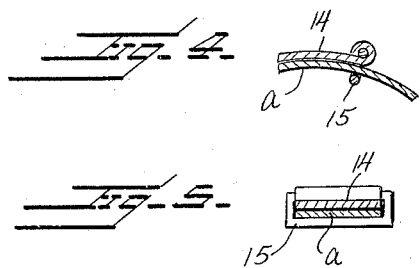
Inventor
S. P. Taylor
By Watson E. Coleman
Attorney

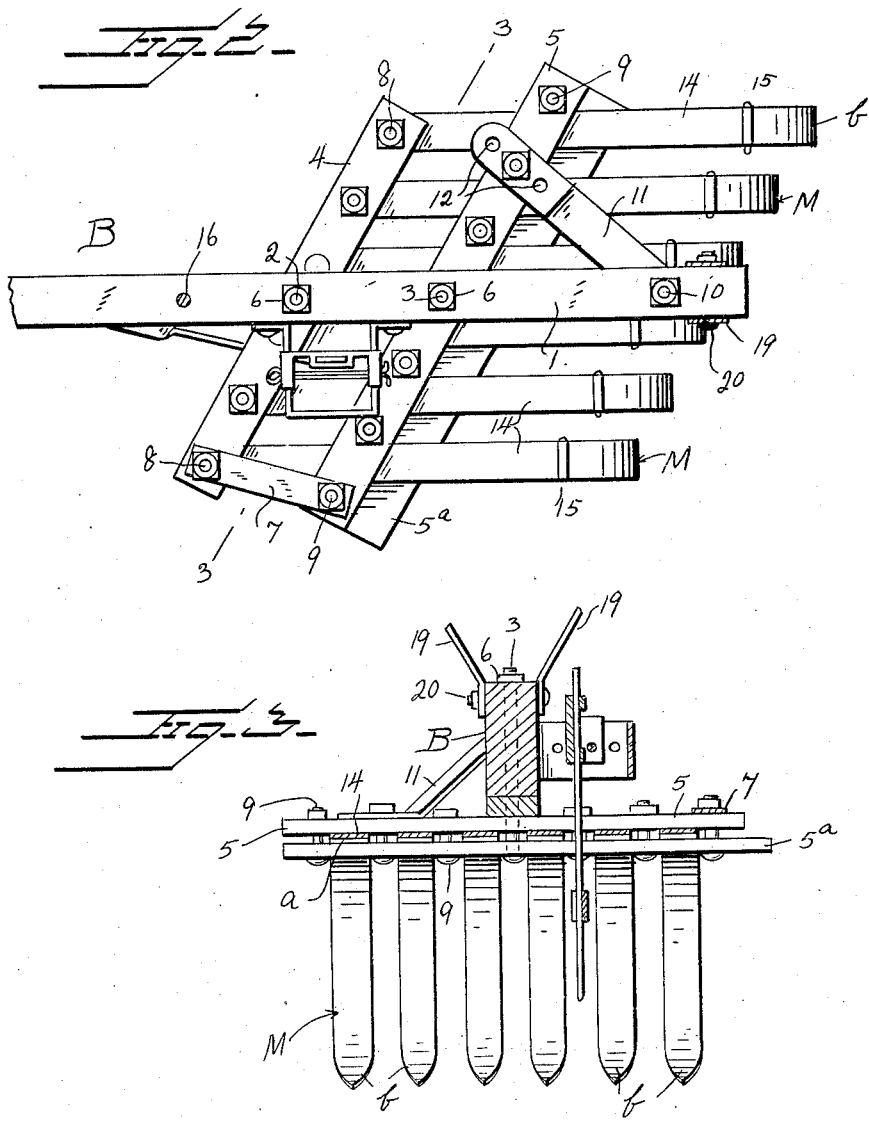

UNITED STATES PATENT OFFICE.

SILAS P. TAYLOR, OF LORETTO, TENNESSEE, ASSIGNOR, BY DIRECT AND MESNE ASSIGNMENTS, TO TENNESSEE IMPLEMENTS SALES CO., OF LORETTO, TENNESSEE, A CORPORATION OF TENNESSEE.

CULTIVATOR.

1,363,375.   Specification of Letters Patent.   Patented Dec. 28, 1920.

Application filed March 24, 1919. Serial No. 284,578.

*To all whom it may concern:*

Be it known that I, SILAS P. TAYLOR, a citizen of the United States, residing at Loretto, in the county of Lawrence and State of Tennessee, have invented certain new and useful Improvements in Cultivators, of which the following is a specification, reference being had to the accompanying drawings.

This invention relates to certain improvements in cultivators, and it is an object of the invention to provide a novel and improved device of this general character comprising a plurality of resilient ground working members assembled in gang and together with means whereby said ground working members may be relatively adjusted.

It is also an object of the invention to provide a device of this general character comprising a plurality of resilient ground working members and wherein each of said members has coacting therewith novel and improved means for bracing or reinforcing the same.

The invention consists in the details of construction and in the combination and arrangement of the several parts of my improved cultivator whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation of a cultivator constructed in accordance with an embodiment of my invention, the beam being shown in fragment.

Fig. 2 is a view in top plan, with portions broken away, of the device as illustrated in Fig. 1.

Fig. 3 is a sectional view taken substantially on the line 3—3 of Fig. 2.

Fig. 4 is a fragmentary longitudinal sectional view taken through the rear end portion of one of the ground working members.

Fig. 5 is a view, partly in cross section and partly in elevation, of the structure illustrated in Fig. 4.

As disclosed in the accompanying drawings, B denotes a beam provided at its forward end with suitable hitching means and having a portion 1 adjacent its rear of increased thickness.

Vertically disposed through the portion 1 of the beam B are the longitudinally disposed bolts 2 and 3 which are also directed through the transverse or cross members 4 and 5, respectively, whereby said members are capable of swinging movement. The bolts 2 and 3 have their shanks upwardly directed, and engaged with the upper extremities thereof and coacting with the top face of the beam B are the holding nuts 6.

The members 4 and 5 extend beyond the opposite sides of the beam B and are arranged in parallelism. Similar end portions of the members 4 and 5 have pivotally engaged therewith a rigid link 7 which operates to maintain the members 4 and 5 in their parallel relation irrespective of their swinging movement.

Carried by and preferably disposed through the member 4 are a plurality of substantially equidistantly and longitudinally spaced members or bolts 8, and each of said bolts or members 8 is disposed through and serves as a pivot for the forward end portion of the rearwardly directed shank $a$ of a ground engaging member M. The rear portion of the shank $a$ is continued by the downwardly curved teeth $b$. The member M is preferably formed of metal possessing inherent resiliency so that during a working operation, said member will have the desired spring action to facilitate its operation.

The shanks $a$ of the members M extend between the member 5 and a supplemental member $5^a$ underlying the member 5 and it is preferred that the supplemental member $5^a$ be of a width in excess of the width of the member 5 with the forward longitudinal marginal portions of said members 5 and $5^a$ substantially flush. The members 5 and $5^a$ are maintained in assembled relation through the medium of the bolts 9 or the like disposed through said members and in the assembly a bolt 9 or the like is arranged at opposite sides of each of the shanks $a$. By this arrangement, the members M have limited lateral swinging movement, one independently of the other, but at no time are they in interference one with the other.

It is to be noted that an end bolt or member 9 constitutes the pivotal connection between the member 5 and the link 7 and that a similar bolt or member 8 constitutes the pivotal connection between said link 7 and the member 4.

Pivotally connected to the under surface of the beam B adjacent its rear and through the medium of the bolt 10 or the like is an end portion of an arm 11, preferably possessing inherent resiliency and the opposite end portion of said arm is provided with a plurality of longitudinally spaced openings 12 whereby the same may be adjustably engaged with the member $5^a$ and preferably with the end portion thereof remote from the link 7. One of the bolts 9 or the like is adapted to be disposed through the desired opening 12. The arm 11 serves to maintain the members 4 and 5 in a desired swinging adjustment about their pivots or bolts 2 and 3 respectively.

I also find it of importance to employ in connection with the shank $a$ of each of the ground working members M a brace or reinforcing member 14. This brace or reinforcing member 14 comprises an elongated resilient member overlying the shank $a$ and disposed longitudinally thereof with its forward end portion pivotally supported by the member 4 through the same instrumentality as the shank $a$. The opposite or rear end portion of the brace or reinforcing member 14 extends partially over the curved tooth $b$.

Pivotally supported by the rear extremity of the brace or reinforcing member 14 is a transversely disposed and downwardly directed loop member 15 through which the member M is freely directed.

Upwardly directed through the beam B in advance of the member 4 is a bolt 16 or the like which also extends above the beam. The extended portion of the bolt 16 is directed through the lower connected end portions of the upwardly and rearwardly diverging handle members H. Engaged with the bolt 16 above the connected end portions of the handle members H, is a holding nut 17. The upper end portions of the handle members H are connected by the spacing member or rod 18. Said handle members also have secured thereto the upper extremities of the supporting members or stays 19 secured at their lower ends through the medium of the bolt 20 or the like to the rear end portion of the beam B.

From the foregoing description, it is thought to be obvious that a cultivator constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

A cultivator comprising, in combination, a beam, a pair of cross members extending beyond opposite sides of the beam and pivotally engaged therewith, said cross members being substantially in parallelism, means for maintaining said members substantially in parallelism in various positions about their pivots, means for holding said cross members against movement relative to the beam, a supplemental cross member carried by one of the first named cross members, said last named cross member being in superimposed relation, ground working members provided with shanks loosely directed between said last named cross members and pivotally engaged with the second of the first named cross members, a resilient bracing member extending along the shank of each of the ground working members, one end portion of said resilient member being pivotally connected with the second of the first named cross members, the pivotal connection of said member being common to the pivotal connection of the ground working member, and a loop member depending from and pivotally engaged with the opposite end portion of the bracing member and through which the adjacent portion of the shank is loosely directed.

In testimony whereof I hereunto affix my signature in the presence of two witnesses.

SILAS P. TAYLOR.

Witnesses:
W. C. CAPERTON,
HENRY J. SANDSCHULTE.